(12) United States Patent
 Quan

(10) Patent No.: US 9,235,436 B2
(45) Date of Patent: *Jan. 12, 2016

(54) METHOD AND APPARATUS OF ACCESSING DATA OF VIRTUAL MACHINE

(71) Applicant: Alibaba Group Holding Limited, Grand Cayman (KY)

(72) Inventor: Xiao Fei Quan, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 14/607,980

(22) Filed: Jan. 28, 2015

(65) Prior Publication Data

US 2015/0193253 A1    Jul. 9, 2015

Related U.S. Application Data

(63) Continuation of application No. 13/502,314, filed as application No. PCT/US2011/060271 on Nov. 10, 2011, now Pat. No. 8,996,809.

(30) Foreign Application Priority Data

Nov. 12, 2010    (CN) .......................... 2010 1 0542916

(51) Int. Cl.
 *G06F 12/00* (2006.01)
 *G06F 9/455* (2006.01)
 *G06F 12/08* (2006.01)

(52) U.S. Cl.
 CPC ............ *G06F 9/45558* (2013.01); *G06F 12/08* (2013.01); *G06F 12/0866* (2013.01); *G06F 12/0897* (2013.01); *G06F 2009/45583* (2013.01); *G06F 2212/1016* (2013.01); *G06F 2212/152* (2013.01); *G06F 2212/154* (2013.01)

(58) Field of Classification Search
 CPC .. G06F 9/45558; G06F 12/08; G06F 12/0866
 See application file for complete search history.

(56) References Cited

U.S. PATENT DOCUMENTS

| 6,446,141 | B1 | 9/2002 | Nolan et al. |
| 7,606,868 | B1 | 10/2009 | Le et al. |
| 7,743,209 | B2 | 6/2010 | Takada et al. |
| 7,793,307 | B2 | 9/2010 | Gokhale et al. |

(Continued)

OTHER PUBLICATIONS

The Chinese Office Action mailed Aug. 16, 2013 for Chinese patent application No. 201010542916.1, a counterpart foreign application of U.S. Appl. No. 13/502,314, 5 pages.

(Continued)

*Primary Examiner* — Aracelis Ruiz
(74) *Attorney, Agent, or Firm* — Lee & Hayes, PLLC

(57) ABSTRACT

A methods and device for accessing virtual machine (VM) data are described. A computing device for accessing virtual machine comprises an access request process module, a data transfer proxy module and a virtual disk. The access request process module receives a data access request sent by a VM and adds the data access request to a request array. The data transfer proxy module obtains the data access request from the request array, maps the obtained data access request to a corresponding virtual storage unit, and maps the virtual storage unit to a corresponding physical storage unit of a distributed storage system. A corresponding data access operation may be performed based on a type of the data access request.

20 Claims, 11 Drawing Sheets

(56) References Cited

U.S. PATENT DOCUMENTS

| | | |
|---|---|---|
| 8,024,506 B1 | 9/2011 | Agesen et al. |
| 2006/0064697 A1* | 3/2006 | Kagi et al. .................... 718/103 |
| 2008/0291827 A1 | 11/2008 | Xiong et al. |
| 2009/0157942 A1 | 6/2009 | Kulkarni |
| 2009/0307688 A1 | 12/2009 | Pafumi et al. |
| 2010/0217916 A1 | 8/2010 | Gao et al. |
| 2010/0228915 A1 | 9/2010 | Ogihara et al. |
| 2010/0274987 A1 | 10/2010 | Subrahmanyam et al. |
| 2011/0047344 A1 | 2/2011 | Eguchi |
| 2011/0167218 A1 | 7/2011 | Matsunami et al. |
| 2011/0276754 A1 | 11/2011 | Bish et al. |
| 2012/0017209 A1* | 1/2012 | Ben-Yehuda et al. ............ 718/1 |
| 2012/0030404 A1 | 2/2012 | Yamamoto et al. |
| 2012/0096206 A1 | 4/2012 | Talamacki et al. |

OTHER PUBLICATIONS

The Extended European Search Report mailed Oct. 7, 2014 for European Patent Application No. 11839861.9, 8 pages.

Office Action for U.S. Appl. No. 13/502,314, mailed on Oct. 25, 2013, Xiao Fei Quan, "Method and Apparatus of Accessing Data of Virtual Machine," 15 pages.

Office Action for U.S. Appl. No. 13/502,314, mailed on Jun. 11, 2014, Xiao Fei Quan, "Method and Apparatus of Accessing Data of Virtual Machine," 15 pages.

The PCT Search Report and Written Opinion mailed Mar. 16, 2012 for PCT application No. PCT/US11/60271, 7 pages.

* cited by examiner

METHOD AND APPARATUS OF ACCESSING DATA OF VIRTUAL MACHINE

CROSS REFERENCE TO RELATED PATENT APPLICATIONS

This application is a continuation of and claims priority to U.S. patent application Ser. No. 13/502,314, now U.S. Pat. No. 8,996,809, filed Apr. 16, 2012 which is a national stage application of an international patent application PCT/US11/60271, filed Nov. 10, 2011, which claims priority to Chinese Patent Application No. 201010542916.1, filed on Nov. 12, 2010, entitled "METHOD AND DEVICE FOR ACCESSING VIRTUAL MACHINE DATA," which applications are hereby incorporated by reference in their entirety.

TECHNICAL FIELD

This disclosure relates to the field of computer technologies. More particularly, the disclosure relates to a method and device for accessing data on a virtual machine.

BACKGROUND

A virtual machine (VM) is a computer system that simulates functions of a complete hardware system by using software, and operates in an isolated environment. By implementing VM technologies, a physical computer may emulate one or more virtual computers. Like a physical computer, a VM may, for example, install operating systems as well as applications and accesses the Internet resources.

In general, data of a VM is stored in a virtual disk of the VM. The virtual disk is stored in a physical disk of a local physical computer in the form of mirror documents, logic virtual volumes, logic disks or logic disk partitions. The VM may access the data by accessing the physical disk of the local computer. This may present problems, for example, when the local computer is shut down or damaged.

SUMMARY

This disclosure provides methods and devices for accessing virtual machine (VM) data. In some aspects, a device may comprise an access request process module, a data transfer proxy module, and a virtual disk. The access request process module receives a data access request that is sent by a VM, and adds the data access request to a request array. The data transfer proxy module obtains the data access request from the request array, maps the data access request to a corresponding virtual storage unit, and maps the virtual storage unit to a corresponding physical storage unit of a distributed storage system. In the distributed storage system, a corresponding data access operation may be performed based on a type of the data access request. In some aspects, the device may further comprise a second-level cache module, a third-level cache module, and/or a data snapshot module.

BRIEF DESCRIPTION OF THE DRAWINGS

The Detailed Description is described with reference to the accompanying figures. The use of the same reference numbers in different figures indicates similar or identical items.

DETAILED DESCRIPTION

As discussed above, under conventional virtual machine (VM) technologies, the state of local physical computers may affect security and reliability of data of VMs. Because of security and reliability concerns, development and applications of VM techniques are dramatically limited. This disclosure describes various exemplary ways of improving security and reliability of accessing VM data, for example, by mapping virtual storage of a virtual disk to physical storage of a distributed storage system. This disclosure may provide a data transmission channel between a VM and a distributed storage system, and, therefore, provide overall, consistent, complete, high-efficient, secured, and compatible data access services.

Figure 1:
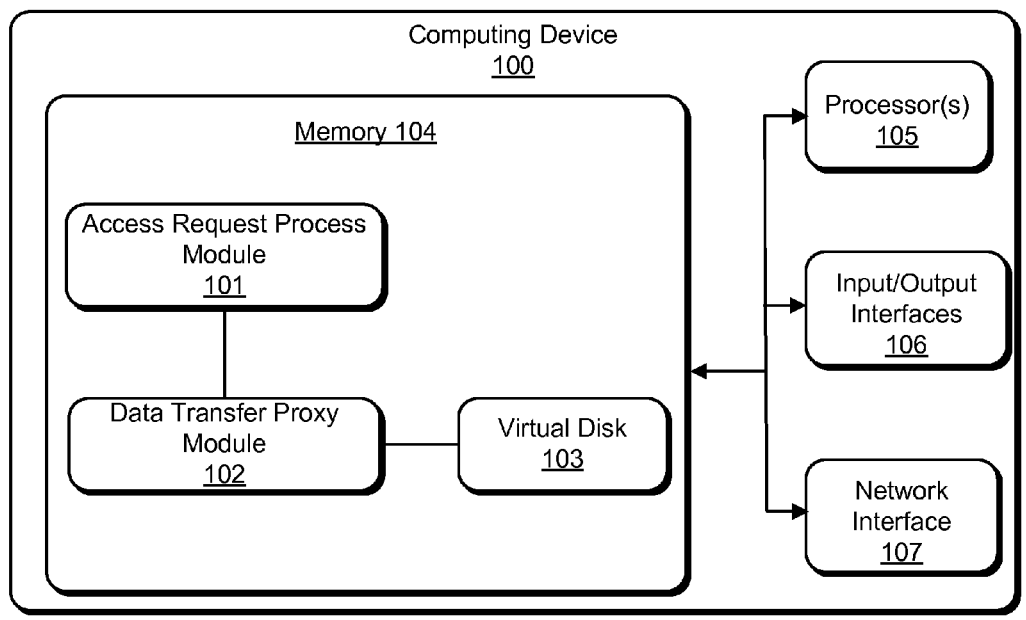
FIG. 1 is a schematic block diagram showing details of an exemplary computing device for accessing data of a virtual machine (VM).

FIG. 1 is a schematic block diagram showing details of the exemplary computing device 100 for accessing data of a VM. The computing device 100 may be configured as any suitable device. In one exemplary configuration, the computing device 100 includes one or more processors 105, input/output interfaces 106, network interface 107, and memory 104.

The memory 104 may include computer-readable media in the form of volatile memory, such as random-access memory (RAM) and/or non-volatile memory, such as read only memory (ROM) or flash RAM. The memory 104 is an example of computer-readable media.

Computer-readable media includes volatile and non-volatile, removable and non-removable media implemented in any method or technology for storage of information such as computer readable instructions, data structures, program modules, or other data. Examples of computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include transitory media such as modulated data signals and carrier waves.

Turning to the memory 104 in more detail, the memory 104 may store an access request process module 101, a data transfer proxy module 102 and a virtual disk 103, and one or more applications for implementing all or a part of accessing data of a VM (not shown in FIG. 1). The access request process module 101 receives a data access request from a VM and adds the data access request to a request array. In some embodiments, the data access request maps to a virtual storage unit of the virtual disk 103, and the virtual storage unit maps to a physical storage unit of a distributed storage system (See FIG. 2).

The data transfer proxy module 102 obtains the data access request from the request array, maps the data access request to a corresponding virtual storage unit, and maps the virtual storage unit to a corresponding physical storage unit of the distributed storage system. In some embodiments, the data transfer proxy module 102 may, based on a type of the data access request, perform operations on corresponding data on the physical storage unit of the distributed storage system.

Suppose that the type of obtained data access request is "write data" and that the mapped physical storage unit information is sent to the distributed storage system. As a result, the distributed storage system operates "write data" based on the physical storage unit information. If the type of obtained data access request is "read data," the data is read from the distributed storage system based on the physical storage unit information, and the data can be fed back to the VM.

Figure 2:
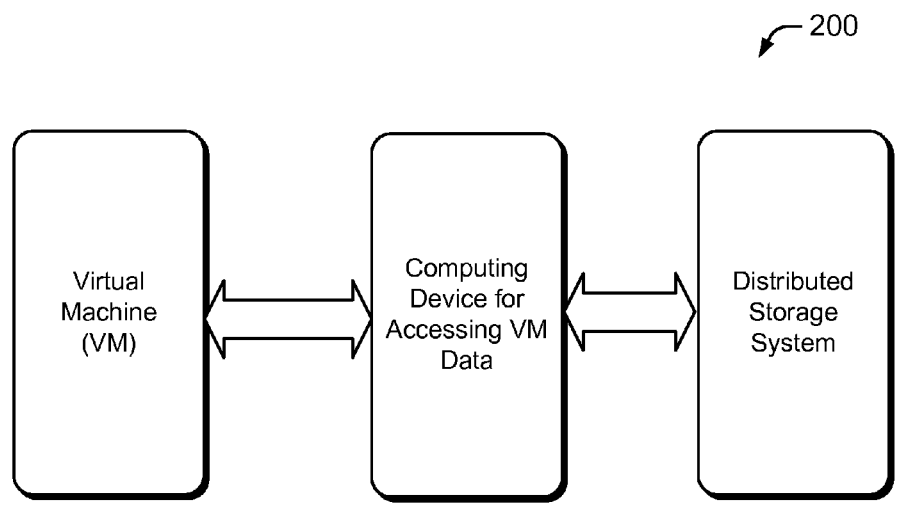
FIG. 2 is a schematic diagram showing an exemplary environment for accessing data of a VM.

FIG. 2 is a schematic diagram showing an exemplary environment 200 that may include a virtual machine, a computing device (e.g., the computing device 100) and a distributed storage system. Data in a virtual disk of a VM can be saved in physical disks of multiple physical computers in a distributed storage system based on the mapping techniques. As a result, a backup associated with the VM data can be implemented, and the security and the reliability of the stored VM data can be improved.

Figure 3:
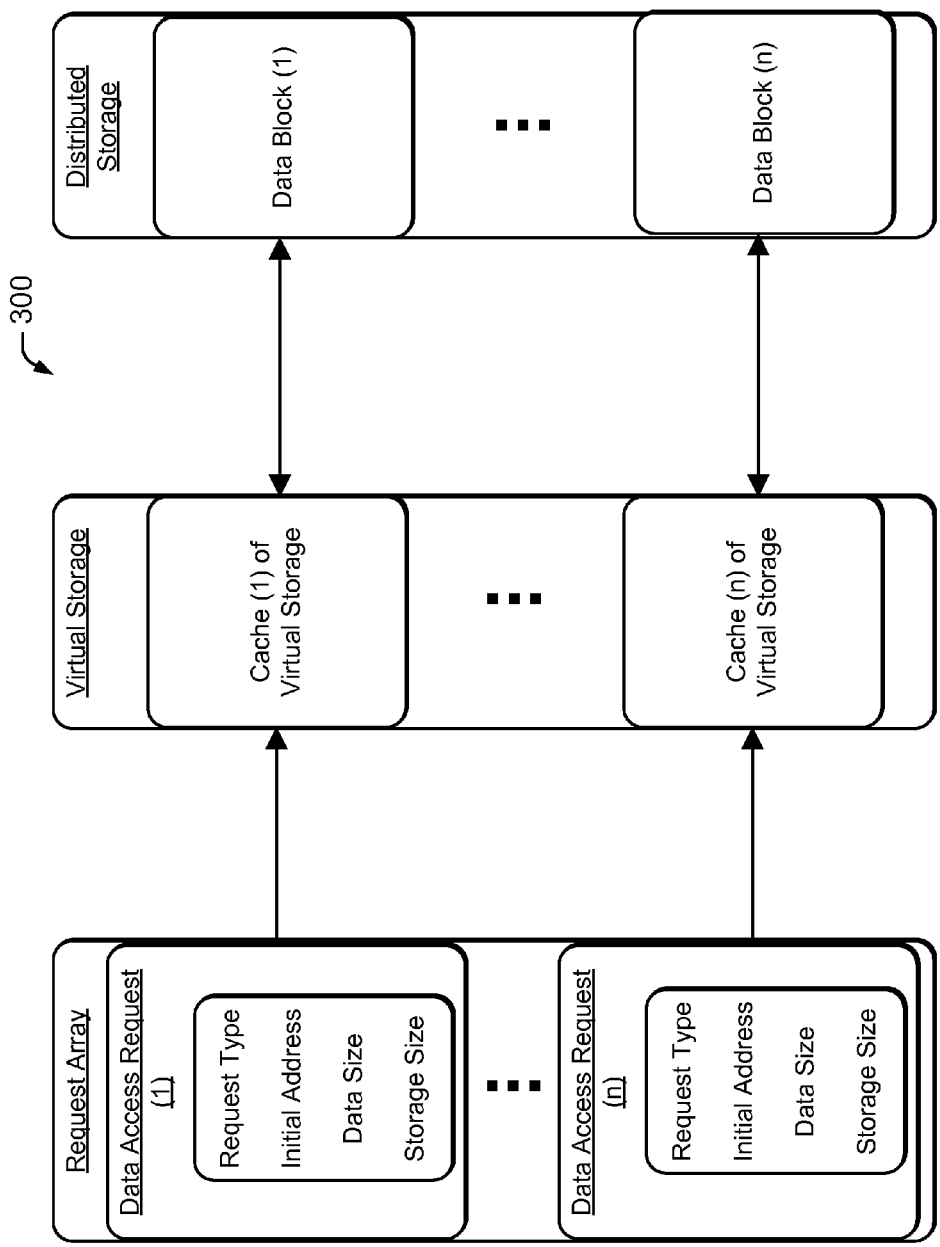
FIG. 3 is a schematic block diagram showing an exemplary mapping relationship.

FIG. 3 is a schematic block diagram showing an exemplary mapping relationship 300. In some embodiments, the data access request in the request array is mapped to a virtual storage unit in a virtual disk, and the virtual storage unit further is mapped to a physical storage unit in a distributed storage system. As shown in FIG. 3, the data access request may include a request type, an initial address of data, a data size, and an address size. The request type indicates a requested operation on the data (e.g., read, write or delete). The initial address of data indicates an initial address of the data in the virtual storage unit of the virtual disk of to which the data access request accesses. A virtual storage size of data may be obtained based on the initial address of data and the size of data. The storage size indicates a storage size for caching data associated with the data access request in memory of a physical computer associated with the VM.

A virtual storage unit mapped to a data access request can be determined based on the initial address of the data and the size of the data associated with the data access request. The virtual storage unit is configured to save the data associated with the data access request. Based on the virtual storage unit and the associated mapping relationship, a physical storage unit of the distributed storage system can be determined. The physical storage unit associated with the data access request is determined based on the initial address and the size of the data associated with the data access request. A data access channel from the VM to the distributed storage system is then established, and, therefore, the data access from the VM to the distributed storage system can be implemented.

In some embodiments, the data transfer proxy module 102 may obtain individual data access requests from a request array, for example, after getting notification from the access request process module 101. The data transfer proxy module 102 may actively access the request array periodically to obtain data access requests. The data access requests are then firstly mapped to corresponding virtual storage units, which are further mapped to corresponding physical storage units of a distributed storage system. The physical storage units can be determined based on the mapping techniques. As accessing VM data described in this disclosure requires merely a mapping relationship without copying data, system resources can be saved by using less time and storage.

In some embodiments, a request array may correspond to a thread with respect to multithreading applications. Suppose that 16 threads are concurrently activated and that each thread implements functions of the data transfer proxy module 102. As a result, 16 data transfer proxy modules can be concurrently activated in the computing device 100 for accessing data of a VM.

Figure 4:
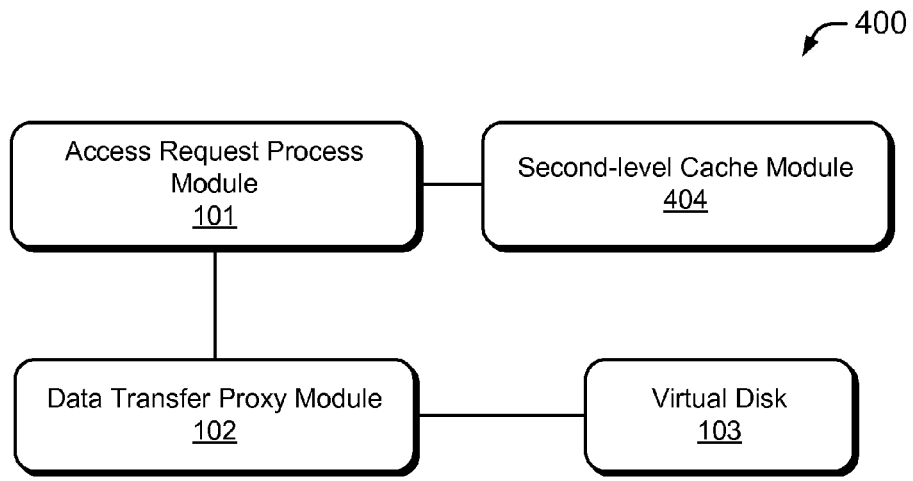
FIG. 4 is a schematic block diagram showing details of another exemplary computing device for accessing data of a VM.

FIG. 4 is a schematic block diagram showing details of an exemplary computing device 400 that may include, similar to the device of FIG. 1, the access request process module 101, the data transfer proxy module 102, and the virtual disk 103. In this FIG. 4 implementation, the computing device 400 further includes a second-level cache module 404. In some embodiments, the access request process module 101 determines whether a second-level cache stores the data associated with the data access request after the access request process module 101 receives the data read request from a VM. If yes, the data can be read from the cache directly. If no, the access request process module adds the data access request to a request array. After the data transfer proxy module 102 reads data, the second-level cache module 404 creates a second-level cache slot to store the data.

For example, when the access request process module 101 receives a data read request (e.g., a data access request indicating to read data A), the access request process module 101 searches a second-level cache. If the second-level cache stores data A, data A is read from the second-level cache directly. Otherwise, the data read request is added to the request array so that data A can be read from a distributed storage system based on the mapping techniques. After the data transfer proxy module 102 reads data A, the second-level cache module 404 creates a second-level cache slot to store data A. In some embodiments, the second-level cache slot is created in advance, and a cache item A is created in the second-level cache slot for data A. The cache item A created for data A is then added to a cache pool of the second-level cache. Therefore, when the data transfer proxy module 102 reads new data, the second-level cache module 404 creates a new cache item in the second-level cache and adds the new cache item into the cache pool of the second-level cache.

In some embodiments, the second-level cache is physical memory of a local physical computer, expediting accessing data of a VM. In some embodiments, data in a virtual disk of a VM can be saved in physical disks of multiple physical computers of a distributed storage system based on the mapping techniques, improving security and reliability of data stored in a VM. In some embodiments, reading data and caching the data in a front-end strategy system can be conducted at the same time to further increase the speed of accessing data of a VM.

Figure 5:
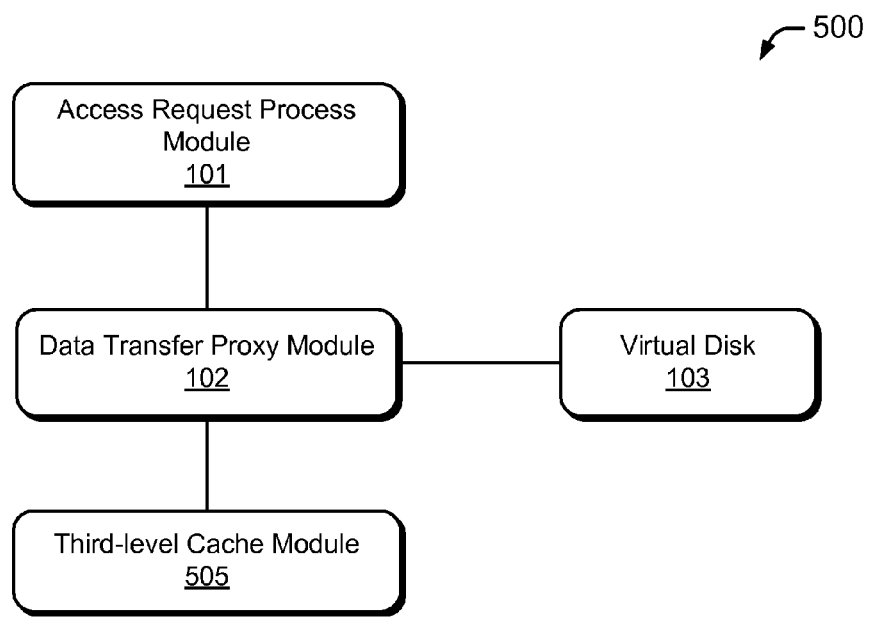
FIG. 5 is a schematic block diagram showing details of yet another exemplary computing device for accessing data of a VM.

FIG. 5 is a schematic block diagram showing details of an exemplary computing device 500 that. Similar to the devices of FIGS. 1 and 4, may include the access request process module 101, the data transfer proxy module 102, and the virtual disk 103. In the FIG. 5 implementation, the device 500 also includes a third-level cache module 505. In some embodiments, the data transfer proxy module 102 determines whether the cache stores the data associated with a data access request after the data transfer proxy module 102 obtains the data read request from the request array. If yes, the data can be read from the cache slot directly. If no, the data transfer proxy module 102 maps the data read request to a corresponding virtual storage unit and maps the virtual storage space to a corresponding physical storage unit. After the data transfer proxy module 102 reads data, the third-level cache module 505 creates a third-level cache slot to store the data. In some embodiments, the data transfer proxy module 102 may further perform operations on the data associated with the data access request.

For example, when the data transfer proxy module 102 obtains a data read request (e.g., a data access request indicating to read data C), the data transfer proxy module 102 searches a third-level cache. If the third-level cache retains data C, data C is read from the third-level cache directly. Otherwise, the obtained data read request is mapped to a corresponding virtual storage unit that is further mapped to a corresponding physical storage unit. After the data transfer proxy module 102 reads data C, the third-level cache module 505 creates a third-level cache slot to store data C. In some embodiments, the third-level cache slot is created in advance, and a cache item C is created in the third-level cache slot for data C. The cache item C is then added to a cache pool of the third-level cache. Therefore, when the data transfer proxy module 102 reads new data, the third-level cache module 505 creates a new cache item in the third-level cache and adds the new cache item into the cache pool of the third-level cache.

In some embodiments, the third-level cache slot is physical memory of a local physical computer, expediting accessing data of a VM. In some embodiments, the computer device 500 may include both the second-level cache module 404 and the third-level cache module 505. In this situation, the access request reaches the access request process module 101 first, and processing memory data is faster than processing disk data. As a result, the second-level cache slot may be located in physical memory of a local physical computer, and the third-level cache slot may be located in a physical disk of a local physical computer to further expedite accessing data of a VM. In some embodiments, data in a virtual disk of a VM can be saved in physical disks of multiple physical computers of a distributed storage system based on the address mapping. Therefore, security and reliability of stored VM data can be improved. In some embodiments, reading data and caching the data in a back-end strategy system can be conducted at the same time to further increase the speed of accessing data of a VM.

Figure 6:
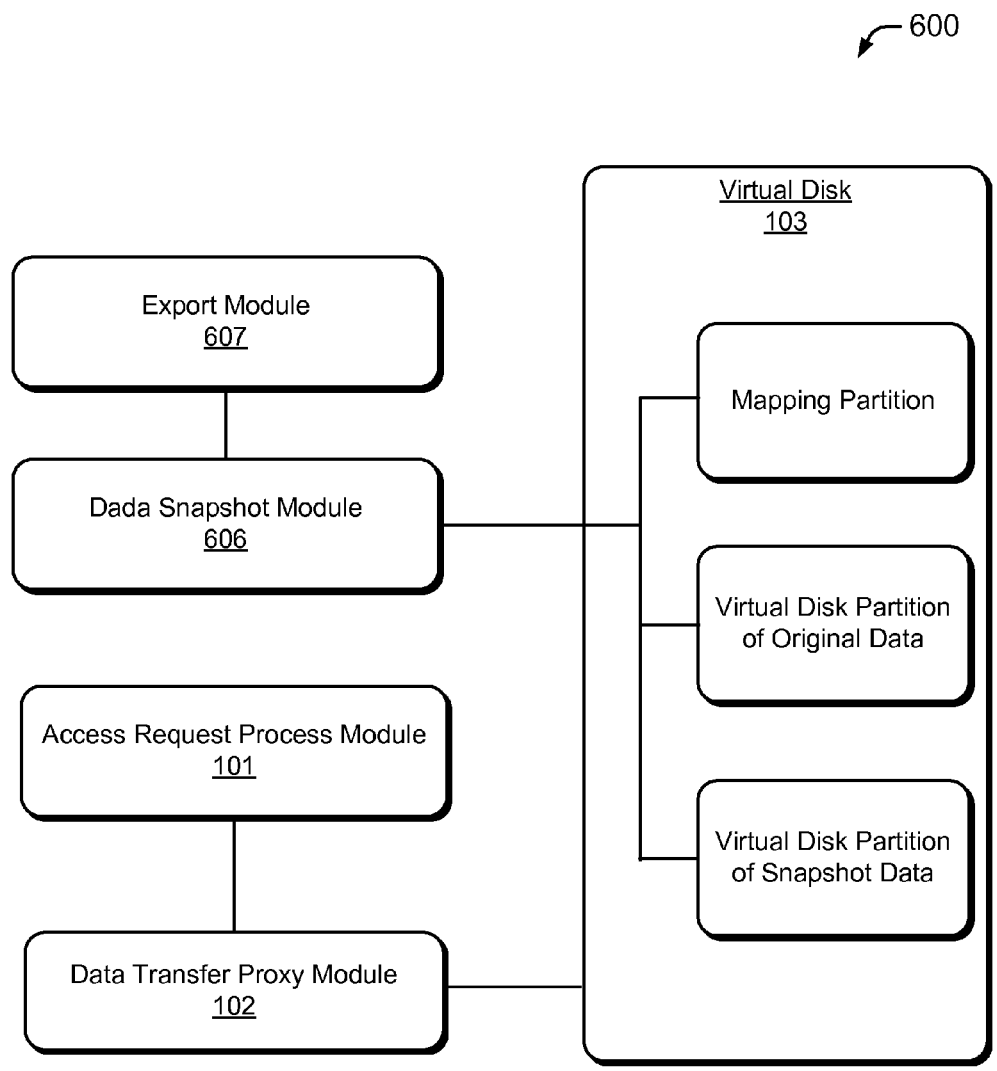
FIG. 6 is a schematic block diagram showing details of still another exemplary computing device for accessing data of a VM.

FIG. 6 is a schematic block diagram showing details of another possible implementation of an exemplary computing device 600. The computing device 600 includes an access request process module 101, a data transfer proxy module 102, a virtual disk 103, and a data snapshot module 606. As shown in FIG. 6, the virtual disk 103 may include a virtual disk partition of original data, a virtual disk partition of snapshot data and a mapping partition. In some embodiments, data in a virtual disk can be saved as snapshot data at a certain time to backup the data in other storage. The data snapshot module 606 obtains a virtual storage slot of the virtual disk partition of original data and a virtual storage slot of the virtual disk partition of snapshot data from the mapping partition.

In some embodiments, the computing device 600 may include the export module 607 that maps the virtual storage slot of the original data and the virtual storage slot of the snapshot data that is obtained by the data snapshot module 606 to corresponding physical storage units of a distributed storage system.

In some embodiments, the computing device 600 includes an import module (not shown) that maps physical storage units of the distributed storage system to virtual disk partitions of original data and virtual disk partitions of snapshot data, after an import request is received. For example, when original data and snapshot data in a distributed storage system need to be exported to other VMs, the import module may map physical storage units of the distributed storage system to virtual disk partitions of the original data and virtual disk partitions of the snapshot data in other VMs. As a result, the data is exported to other storage systems.

Figure 7:
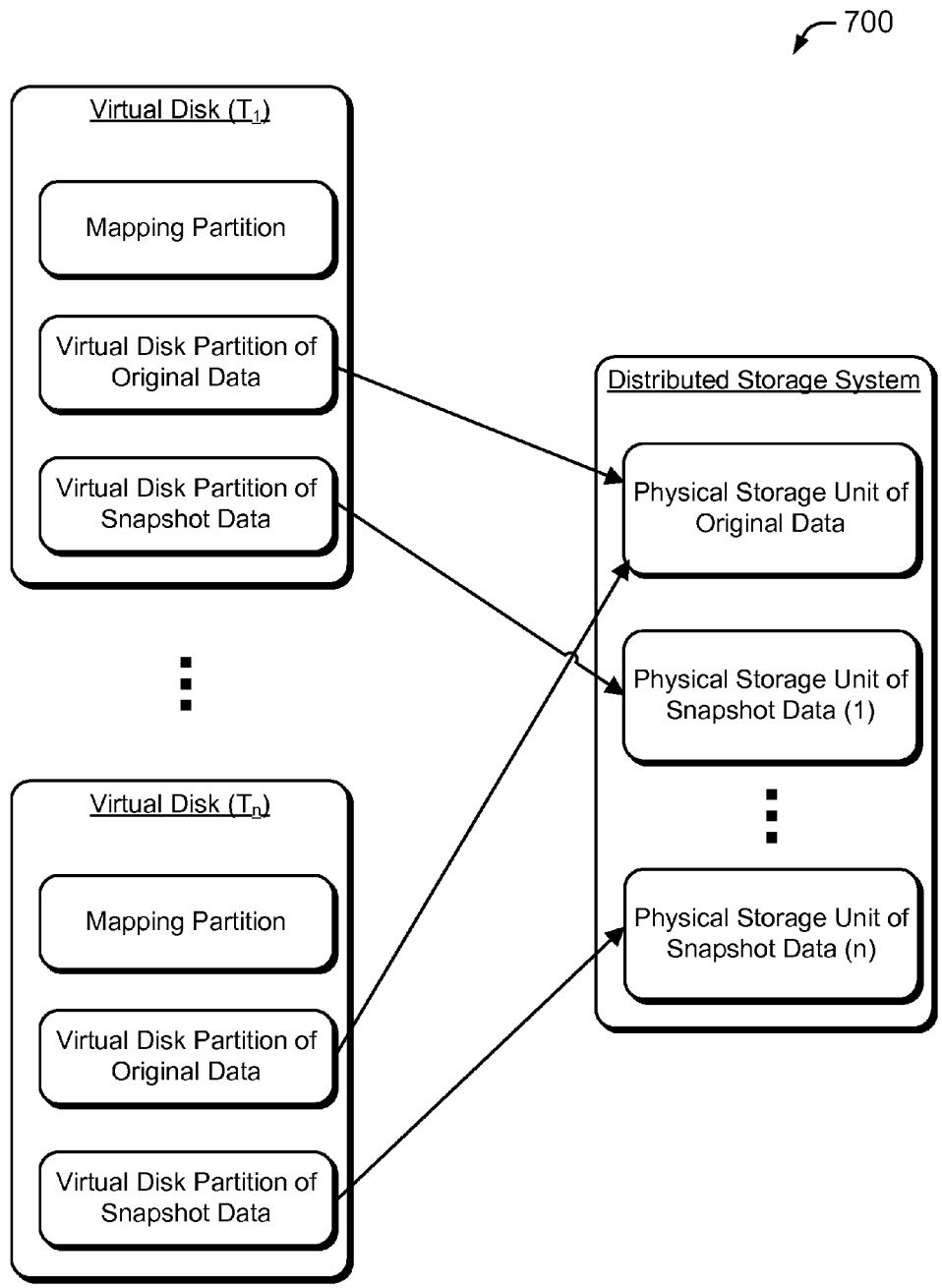
FIG. 7 is a schematic block diagram showing an exemplary mapping relationship between virtual disks and physical storage.

FIG. 7 is a schematic block diagram showing an exemplary mapping relationship between virtual disks and physical storage. In some embodiments, virtual storage units of the virtual disk partition of original data and the virtual disk partition of snapshot data are retained in the mapping partition. The virtual storage units are obtained from the mapping partition when the data snapshot module 606 receives a data snapshot request. The export module 607 maps the virtual storage units to physical storage units of a distributed storage system so that the original data and the snapshot data can be obtained from the physical storage units of the distributed storage system, and that a data snapshot at a certain time can be obtained based on the original data and the snapshot data.

In some embodiments, the sector codes in the device for accessing VM data may include Vm_id, Image_id, Vbd_id, Par_id and Cell_id. Vm_id (32-bit) is the number of a VM; Image_id (32-bit) is the number of an associated mirrored document and can indicate imported snapshot data; Vbd_id (8-bit) is the number of a virtual hard drive; Par_id (8-bit) is the number of a partition; and, Cell_id (64-bit) is the number of a sector. Vm_id, Image_id, Vbd_id and Par_id are configured by a managing system to include information associated with relationship and attribute of a computing device for accessing VM data. In some embodiments, the front-end strategy system combines these codes to uniquely identify sector locations of distributed storage units after receiving the request from an upper-level document system. Then, read/write operations on the sectors are performed based on these codes.

Figure 8:
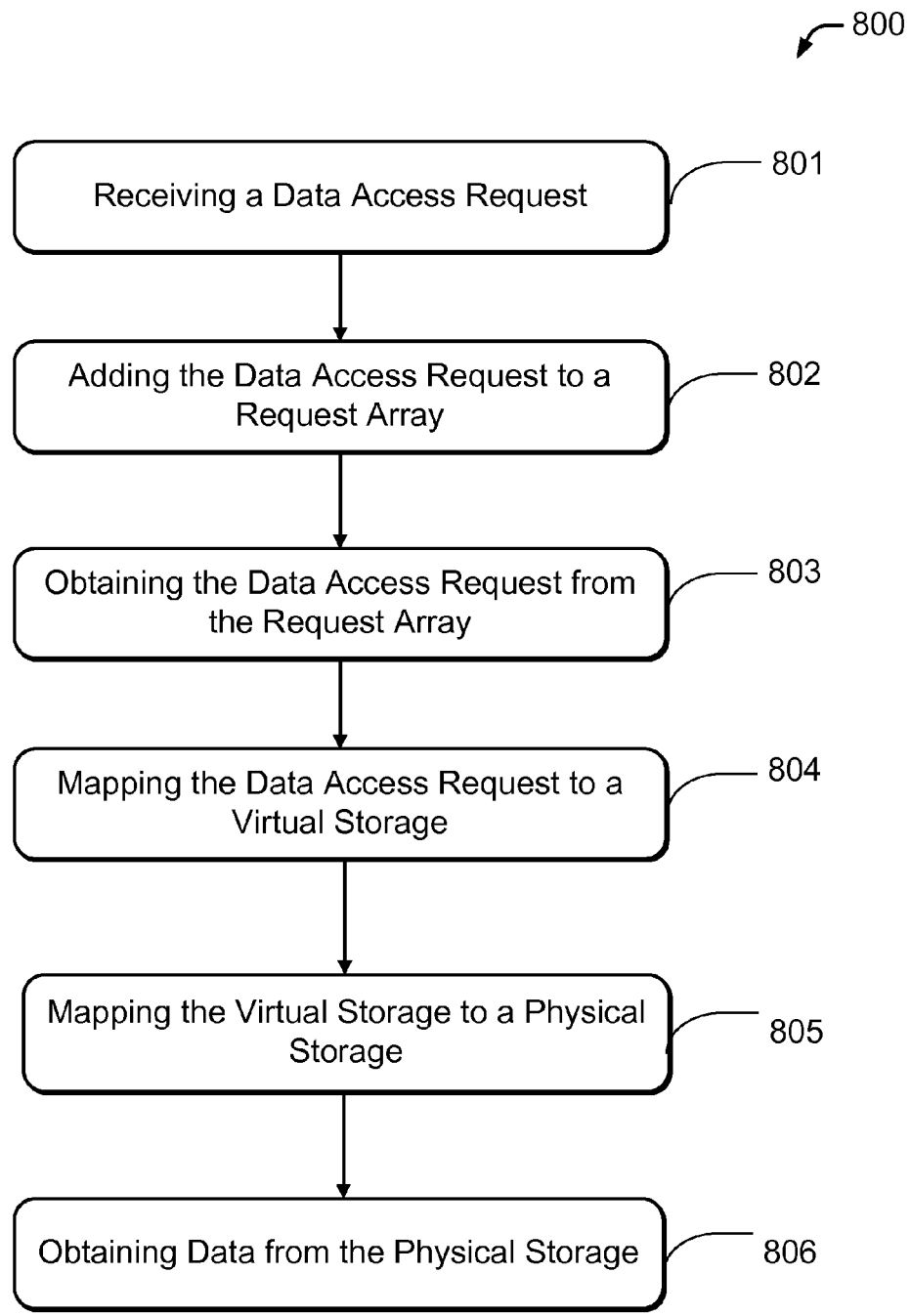
FIG. 8 is a flowchart showing an exemplary process of accessing data of a VM.
Figure 9:
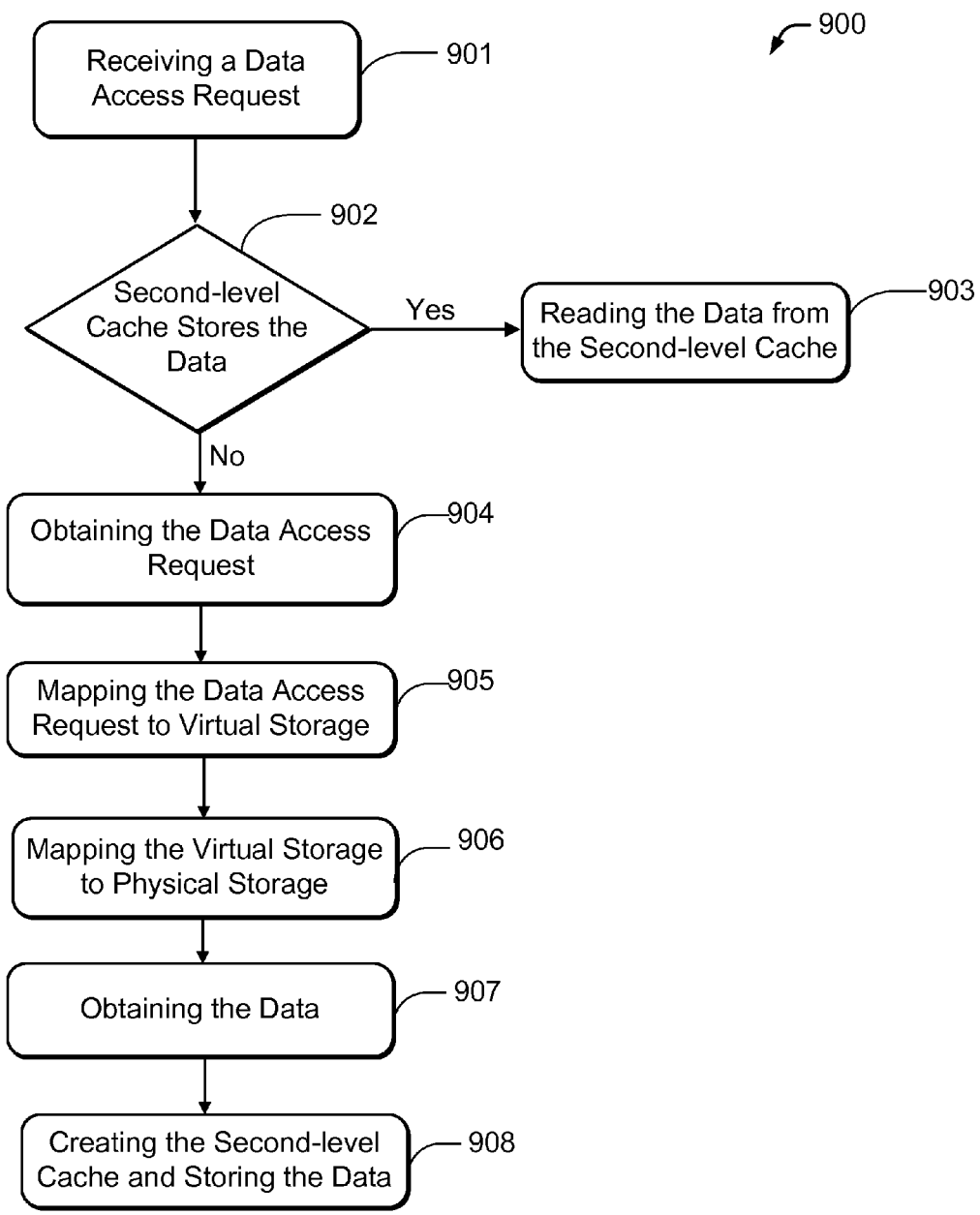
FIG. 9 is a flowchart showing another exemplary process of accessing data of a VM.
Figure 10:
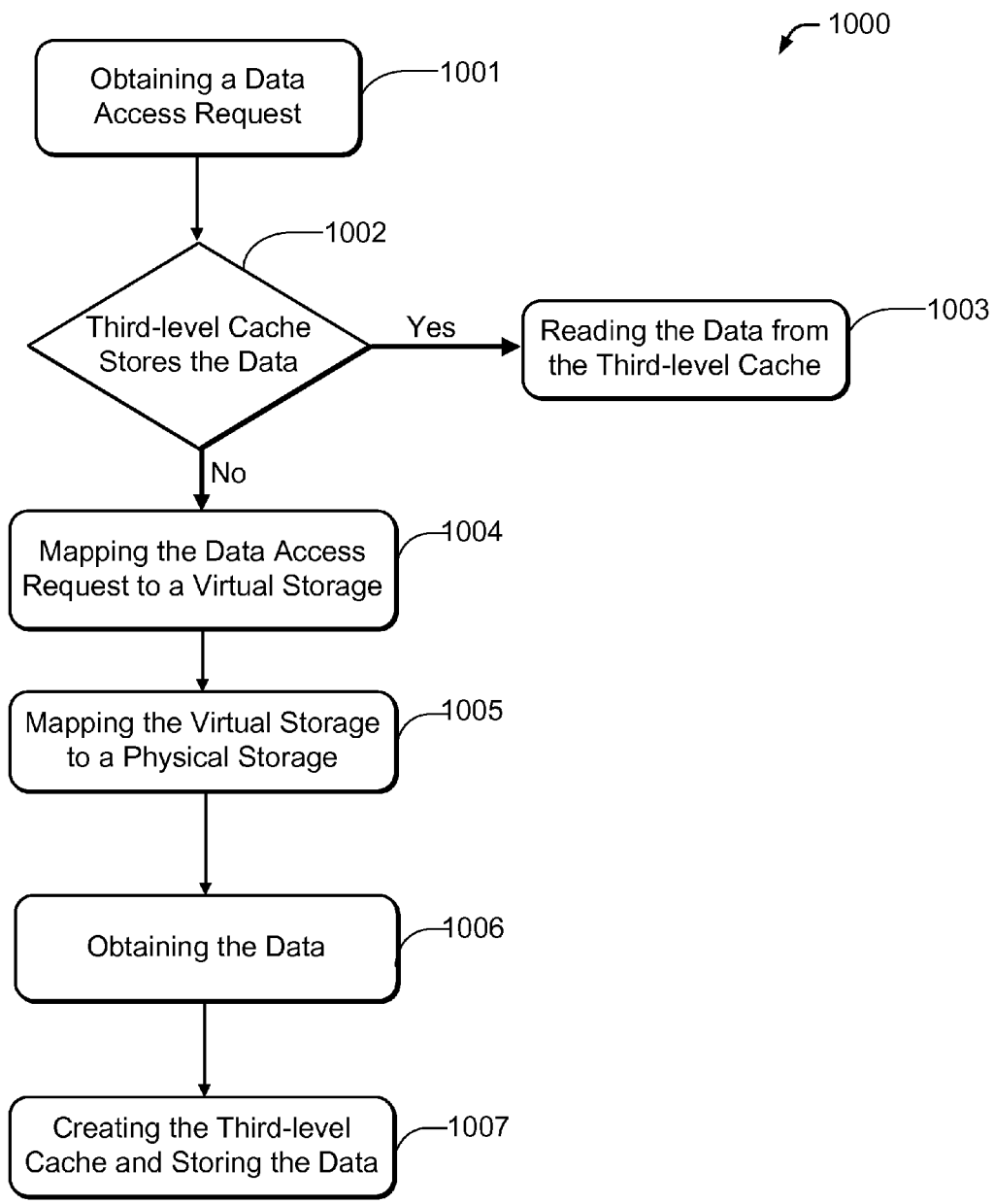
FIG. 10 is a flowchart showing yet another exemplary process of accessing data of a VM.

FIGS. 8-10 are flowcharts showing exemplary processes of accessing data of a VM. The processes are illustrated as a collection of blocks in logical flowcharts, which represent a sequence of operations that can be implemented in hardware, software, or a combination. For discussion purposes, the processes are described with reference to the computing devices 100, 400, 500 and/or 600 shown in FIGS. 1 and 4-6, the computing environment 200 shown in FIG. 2, and the mapping relationships 300 and 700 shown in FIGS. 3 and 7. However, the processes may be performed using different environments and devices. Moreover, the environments and devices described herein may be used to perform different processes.

FIG. 8 is a flowchart showing an exemplary process of accessing data of a VM. At 801, the access request process module 101 receives a data access request that is sent by a VM. At 802, the access request process module 101 adds the data access request to a request array. The data access request maps to a virtual storage unit in a virtual disk, and the virtual storage unit maps to a physical storage unit in a distributed storage system. At 803-805, the data transfer proxy module 102 obtains the data access request from the request array, maps the data access request to a corresponding virtual storage unit, and maps the virtual storage unit to a corresponding physical storage unit. At 806, the transfer proxy module 102 may obtain data from the physical storage unit. In some embodiments, 801-806 may be repeated until all data access requests in the request array are processed.

The distributed storage system may operate a corresponding data access operation in the physical storage unit based on a type of data access request. For example, if the type of the obtained data access request is "write data", the distributed storage system operates "write data" based on the physical storage unit information that is sent to the distribution storage system from the computing device 100. If the type of the obtained data access request is "read data", the data is read from the distributed storage system based on the physical storage unit information. As a result, the data can be fed back to the VM associated with the date access request.

FIG. 9 is a flowchart showing an exemplary process of accessing data of a VM. At 901, the access request module 101 receives a data access request that is sent by a VM. At 902, the access request module 101 determines whether a second-level cache unit stores the data associated with the data access request. If the data is stored (i.e., the "yes" branch from 902), the data transfer proxy module 102 directly reads the data at 903. If the data is not stored (i.e., the "no" branch from 902), the data transfer proxy module 102 obtains the data access request from a request array after the data access request is added to the request array at 904. At 905 and 906, the data transfer proxy module 102 maps the data access request to a corresponding virtual storage unit, and maps the virtual storage unit to a corresponding physical storage unit. At 907, the data transfer proxy module 102 obtains the data associated with the data access request. At 908, the second-level cache module 404 creates a second-level cache slot to store the data. In some embodiments, 901-908 may be repeated until all data access requests in the request array are processed.

FIG. 10 is a flowchart showing an exemplary process of accessing data of a VM. In some embodiments, to expedite data access processes, a third-level cache may be created after a corresponding data read operation is performed in the mapped physical storage units based on the associated data read request. At 1001, the data transfer proxy module 102 obtains a data access request from a request array. At 1002, the data transfer proxy module 102 determines whether a third-level cache stores the data associated with the data access request. If the data is stored (i.e., the "yes" branch from 1002), the data transfer proxy module 102 reads the data directly from the third-level cache at 1003. If the data is not stored in the third-level cache (i.e., the "no" branch from 1002), the data transfer proxy module 102 maps the data access request to a virtual storage unit, and maps the virtual storage unit to a physical storage unit of a distributed storage system. At 1006, the data transfer proxy module 102 obtains the data from the distributed storage system. At 1007, a third-level cache module creates a third-level cache slot to store the data. In some embodiments, 1001-1007 may be repeated until all data access request in the request array are processed.

In some embodiments, the processes described above may further include obtaining snapshot data associated with the data access request. For example, the data snapshot module 606 may obtain a virtual storage unit of a virtual disk partition of original data and a virtual storage unit of a virtual disk partition of snapshot data from a mapping partition of the virtual disk after a snapshot request is received, map the virtual storage unit of the original data and the virtual storage unit of the snapshot data to corresponding physical storage units of the distributed storage system after an export request is received.

In some embodiments, reading and caching the data associated with the data access request in the front-end strategy system can be conducted at the same time. For example, after the access request process module 101 receives the next data access request, the data associated with the data access request can be read from a cache that stores the data, expediting accessing data of a VM. In some embodiments, reading and caching the data associated with the data access request in the back-end mechanism system can be conducted at the same time. For example, after the data transfer proxy module 102 obtains the next data access request, the data can be read from a cache that stores the data, expediting accessing data of a VM.

In some embodiments, the processes described above may be performed in different environments and devices, for example, a single virtual machine start, a multiple-machine parallel virtual machines start, a virtual machine migration, and/or shared storage. FIGS. 11-14 show four different embodiments to illustrate these four cases.

Figure 11:
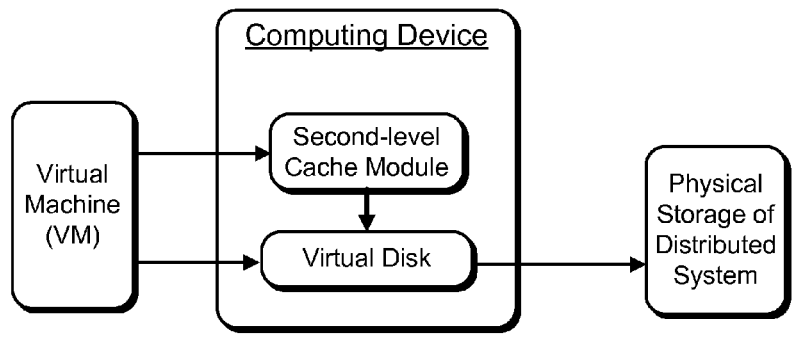
FIG. 11 is a schematic block diagram showing details of an exemplary system for accessing data of a single VM.

FIG. 11 is a schematic block diagram showing details of an exemplary system 1100 for accessing data of a single VM. The system 1100 may include a computing device, similar to the devices of FIGS. 1, 4 and 5, a VM, and physical storage of a distributed system. By implementing a single virtual machine start, the start time and the response speed of a VM are improved.

Figure 12:
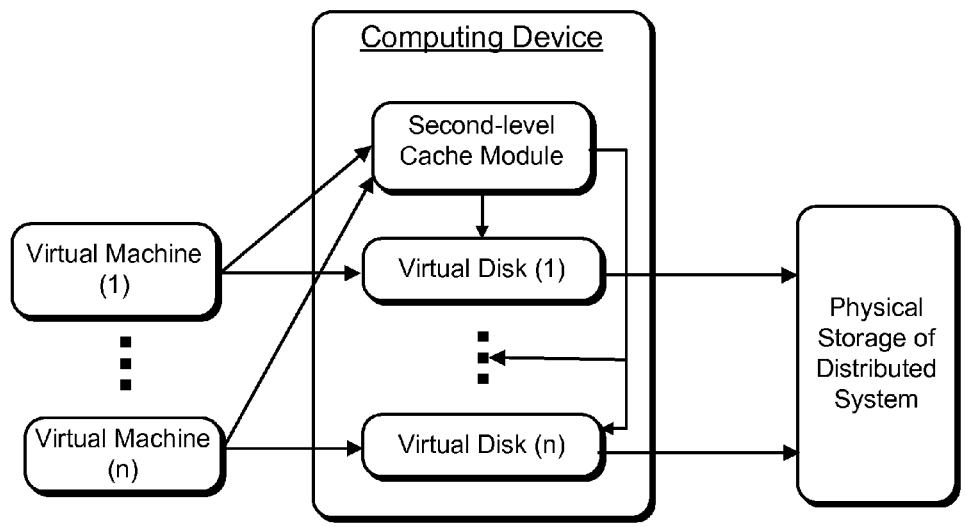
FIG. 12 is a schematic block diagram showing details of an exemplary system for accessing data of parallel VMs.

FIG. 12 is a schematic block diagram showing details of an exemplary system 1200 for accessing data of parallel VMs. The system 1200 may include a computing device, similar to the devices of FIGS. 1, 4 and 5, a plurality of parallel VMs, and physical storage of a distributed system. By implementing a multiple-machine parallel virtual machines start, the start time and the response speed of a VM are improved too.

Figure 13:
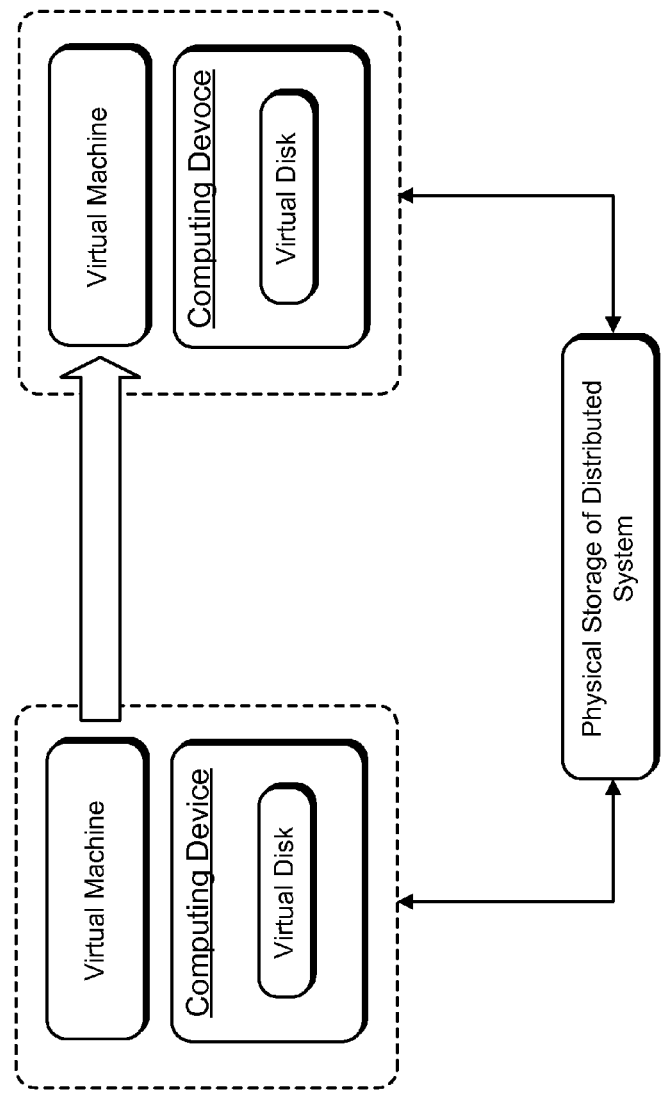
FIG. 13 is a schematic block diagram showing details of an exemplary system for implementing a VM migration.

FIG. 13 is a schematic block diagram showing details of an exemplary system 1300 for implementing a VM migration. The System 1300 may include a plurality of computing devices, similar to the devices of FIGS. 1, 4 and 5, a plurality of corresponding VMs, and physical storage of a distributed system. By implementing a virtual machine migration, the amount of data migration is reduced and the migration speed is increased.

Figure 14:
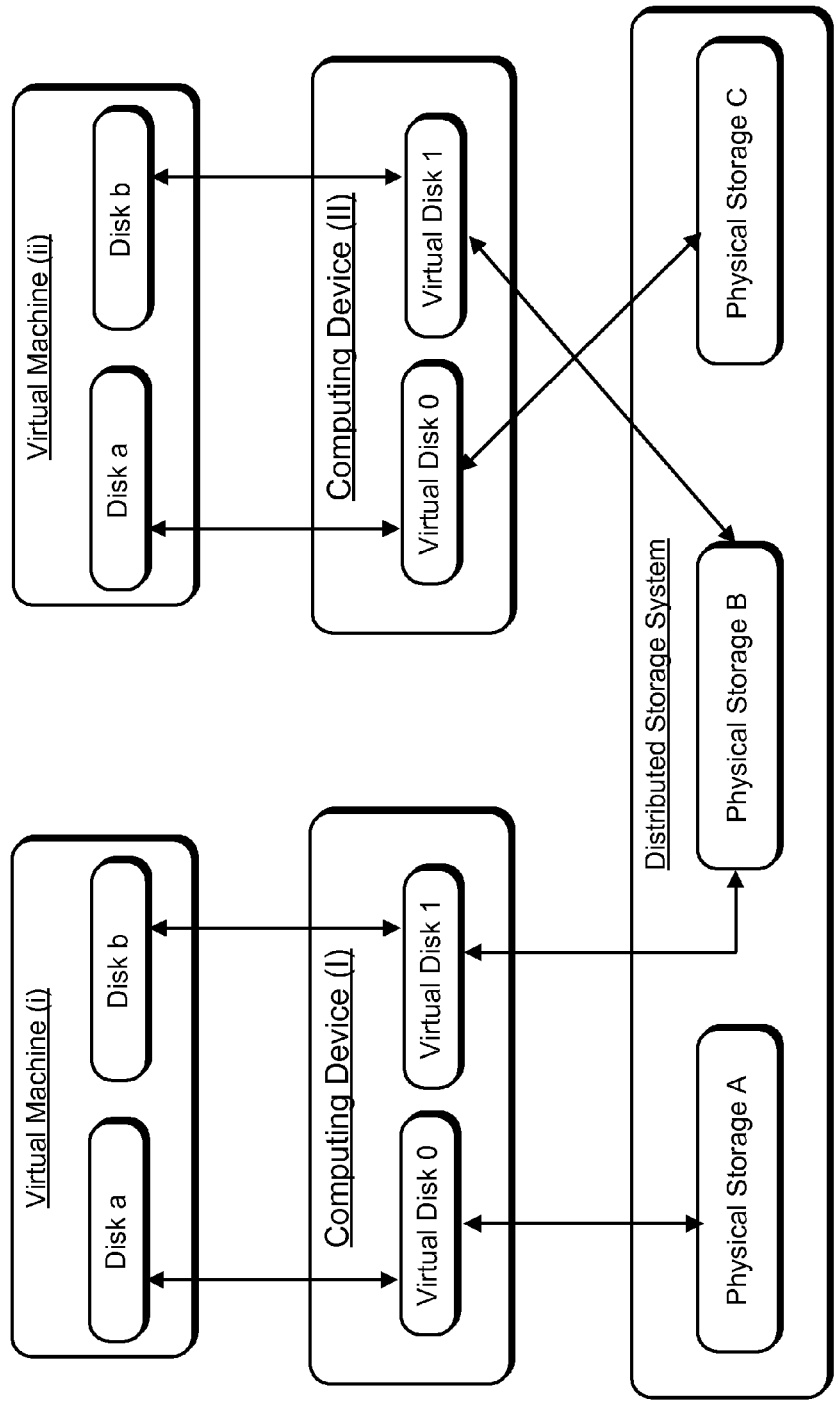
FIG. 14 is a schematic block diagram showing details of an exemplary system for accessing data of VMs by implementing shared storage.

FIG. 14 is a schematic block diagram showing details of an exemplary system 1400 for accessing data of VMs by implementing shared storage. The system 1400 may include a plurality of computing devices, similar to the devices of FIGS. 1, 4 and 5, a plurality of corresponding VMs, and a plurality of physical storage units of distributed systems (i.e., physical storage A, B and C). In the system 1400, the distributed systems are installed on servers, and each server node stores data in local hard drives (not shown). Each server node may construct a storage area network (SAN) by employing the plurality of computing devices of FIG. 14 for accessing VM data. Accordingly, SAN shared software may be configured to implement the shared storage devices and to manage data development access in a group. By way of example and not limitation, the SAN shared software may include pNFS/GFS2, and CIFS for Windows system.

The embodiments in this disclosure are merely for illustrating purposes and are not intended to limit the scope of this disclosure. A person having ordinary skill in the art would be able to make changes and alterations to embodiments provided in this disclosure. Any changes and alterations that persons with ordinary skill in the art would appreciate fall within the scope of this disclosure.

What is claimed is:

1. A device comprising:
   memory including at least a virtual storage unit;
   one or more processors coupled to the memory;
   an access request process module, stored in the memory and executable by the one or more processors, that:
      receives a data access request from a virtual machine,
      determines whether data associated with the data access request is stored in a cache storage,
      obtains the data associated with the data access request in an event that the data associated with the data access request is stored in the cache storage, and
      adds the data access request to a request array in an event that the data associated with the data access request is not stored in the cache storage; and
   a data transfer proxy module, stored in the memory and executable by the one or more processors, that:
      obtains the data access request from the request array, and
      maps the data access request to the virtual storage unit that corresponds to a physical storage unit of a storage system.

2. The device as recited in claim 1, wherein the data transfer proxy module further performs a data access operation on the data associated with the data access request based on a request type that is included in the data access request.

3. The device as recited in claim 1, further comprising a cache module stored in the memory and executable by the one or more processors that creates a cache slot of the cache storage to store the data associated with the data access request.

4. The device as recited in claim 1, wherein the cache storage comprises a local memory or a local physical disk of a local computing device.

5. The device as recited in claim 1, further comprising a data snapshot module stored in the memory and executable by the one or more processors, wherein the virtual disk comprises a virtual disk partition of original data, a virtual disk partition of snapshot data and a mapping partition, and the data snapshot module obtains a virtual storage unit of the virtual disk partition of the original data and a virtual storage unit of the virtual disk partition of the snapshot data from the mapping partition.

6. The device as recited in claim 5, further comprising an export module, stored in the memory and executable by the one or more processors, that maps the virtual storage unit of the original data and the virtual storage unit of the snapshot data to physical storages units of the storage system after an export request is received.

7. The device as recited in claim 5, further comprising an import module, stored in the memory and executable by the one or more processors, that maps physical storages units of the storage system to the virtual storage unit of the original data and the virtual storage unit of the snapshot data after an import request is received.

8. The device as recited in claim 5, wherein the data snapshot module further obtains the original data and the snapshot data from physical storages units.

9. A computer-implemented method comprising:
   receiving a data access request from a virtual machine;
   determining whether a cache stores data associated with the data access request;
   in an event that the cache stores the data associated with the data access request,
      obtaining the data associated with the data access request from the cache; and
   in an event that the cache does not store the data associated with the data access request,
      placing the data access request in a request array;
      obtaining the data access request from the request array;
      mapping the data access request to a virtual storage unit of a virtual disk;
      mapping the virtual storage unit to a physical storage in a distributed storage system; and
      performing a data operation associated with the data access request.

10. The computer-implemented method as recited in claim 9, wherein the data access request includes a request type, an initial address of data storage, and a data size.

11. The computer-implemented method as recited in claim 9, wherein the performing comprises performing the data operation based on a request type of the data access request.

12. The computer-implemented method as recited in claim 9, further comprising creating a cache slot to store the data associated with the data access request after obtaining the data from the distributed storage system if the data is not stored in the cache.

13. The computer-implemented method as recited in claim 9, further comprising:
   obtaining a virtual storage unit of a virtual disk partition of original data and a virtual storage unit of a virtual disk partition of snapshot data from a mapping partition after a snapshot request is received;
   mapping the virtual storage unit of the original data and the virtual storage unit of the snapshot data to physical storage units of the distributed storage system after an export request is received; and
   obtaining the original data and the snapshot data from the distributed storage system.

14. One or more computer-readable media encoded with instructions that, when executed by one or more processors, cause the one or more processors to perform acts comprising:
   receiving a data access request from a virtual machine;
   obtaining data from a physical storage unit of a storage system based on the data access request;
   creating a front-end cache slot to store the data in a front-end cache storage in response to determining that the front-end cache storage does not stores the data; and
   creating a back-end cache slot to store the data in a back-end cache storage in response to determining that the back-end cache storage does not stores the data.

15. The one or more computer-readable media as recited in claim 14, wherein the obtaining of the data, the creating of the front-end cache slot and the creating of the back-end cache slot are performed simultaneously.

16. The one or more computer-readable media as recited in claim 15, wherein the front-end cache slot is located in memory of a local computing device, and the back-end cache slot is located in a physical disk of the local computing device.

17. The one or more computer-readable media as recited in claim 14, the acts further comprising:
   obtaining a virtual storage unit of a virtual disk partition of original data and a virtual storage unit of a virtual disk partition of snapshot data from a mapping partition after receiving a data snapshot request;
   mapping the virtual storage unit of the original data and the virtual storage unit of the snapshot data to physical storages units of a distributed storage system after receiving an export request; and
   obtaining the original data and the snapshot data from the distributed storage system.

18. The one or more computer-readable media as recited in claim 14, the acts further comprising performing an operation on the data in the physical storage unit based on a type of the data access request.

19. The one or more computer-readable media as recited in claim 14, wherein the data access request comprises includes a request type, an initial address of data storage, and a data size.

20. The one or more computer-readable media as recited in claim 14, wherein the data access request maps to a virtual storage unit of a virtual disk that maps to the physical storage unit of the storage system.

\* \* \* \* \*